United States Patent [19]

Werner et al.

[11] Patent Number: 4,611,778
[45] Date of Patent: Sep. 16, 1986

[54] ADJUSTING DEVICE FOR VEHICLE SEATS

[75] Inventors: Heinz Werner, Remscheid-Hasten; Bernd A. Kluting, Radevormwald; Klaus D. Bertram, Remscheid; Frantisek Svoboda, Erbrath, all of Fed. Rep. of Germany

[73] Assignee: Keiper Recaro GmbH & Co., Fed. Rep. of Germany

[21] Appl. No.: 737,042

[22] Filed: May 23, 1985

[30] Foreign Application Priority Data

May 30, 1984 [DE] Fed. Rep. of Germany ....... 3420221

[51] Int. Cl.4 ........................................... F16M 13/00
[52] U.S. Cl. .................................... 248/429; 248/419
[58] Field of Search ............... 248/429, 430, 421, 419, 248/420, 422, 424; 74/89.15; 296/65 R

[56] References Cited

U.S. PATENT DOCUMENTS

| 636,757 | 11/1899 | Carraway | 182/111 |
|---|---|---|---|
| 2,927,627 | 3/1960 | Lohr | 248/429 |
| 3,728,904 | 4/1973 | Boyriven | 74/89.15 |
| 3,757,591 | 9/1973 | Taylor | 74/89.15 |
| 3,977,262 | 8/1976 | Randolph | 74/89.15 |
| 4,085,624 | 4/1978 | Nomura | 74/89.15 |
| 4,137,784 | 2/1979 | Griffins | 74/89.15 |
| 4,402,482 | 9/1983 | Harbaugh | 248/424 |

FOREIGN PATENT DOCUMENTS

3003175A1 8/1981 Fed. Rep. of Germany .

Primary Examiner—Reinaldo P. Machado
Assistant Examiner—Alvin Chin-Shue
Attorney, Agent, or Firm—Wigman & Cohen

[57] ABSTRACT

The present invention relates to an adjusting device for vehicle seats having a threaded spindle (4) and a spindle nut arranged thereon, each of which is connected in an axially immovable manner with one or the other of elements (1, 2) to be adjusted relative to each other. The spindle nut (13) is provided with a full-length (or continuous) channel (20) running parallel to the threaded bore which receives the threaded spindle (4), which channel receives a bar (22) which prevents a rotation of the spindle nut (13) about the longitudinal axis of its threaded bore. The opposing boundary surfaces (21) of the channel (20), which cooperate with the bar (22) are spaced from each other such that at the midpoint of the channel (20) the space is equal to the bar thickness and uniformly increases toward the two ends of the channel.

14 Claims, 5 Drawing Figures

ADJUSTING DEVICE FOR VEHICLE SEATS

BACKGROUND OF THE INVENTION

The invention relates to an adjusting device for vehicle seats having a threaded spindle and a spindle nut arranged thereon, both of which are connected in an axially immovable manner to the respective elements to be ajusted relative to each other.

In the known adjustment devices of this type, which are used either to adjust the angle of inclination of the back rest or to move the seat longitudinally, an unequal adjustment movement and the rattling noises associated therewith can often not be avoided.

OBJECTS AND SUMMARY OF THE INVENTION

Because these occurrences are bothersome, an object of the invention is to improve the adjustment device of the above-described type in such a manner that a uniform adjustment movement can be achieved and disruptive noises suppressed.

In accordance with the invention, the securing of the threaded nut against rotation about the longitudinal axis of its threaded bore does not inhibit an automatic adjustment of the spindle nut. Despite unavoidable manufacturing and mounting tolerances, the spindle nut and the threaded spindle can therefore be adjusted such that friotion remains constant evan under load, and therefore a uniform operation is assured, independently of whether the drive takes place manually or by means of a motor. This avoids the occurrence of noises. The solution according to the invention is particularly advantageous for a longitudinal seat adjustment and an adjustment of the angle of inclination of the back rest, but is also suited for other seat adjustments, such as an adjustment of the seat height.

With respect to economical manufacture, in a preferred embodiment the two boundary surfaces of the channel holding the bar have a cylindrical curvature.

Preferably, the channel is open on the side opposite the threaded bore. This is advantageous for more than manufacturing reasons. The channel also permits an adjustment of the nut in a direction lying at a right angle to the adjustment angle which the nut has due to the curved boundary surfaces of the channel. With respect to the bar, the nut here has a limited cardan movability or adjustability. So that the bar does not have to project from the open side of the channel, the lateral dimension of the channel defined by the curved boundary surfaces is advantageously larger than the dimension of the bar in this direction.

In order to be able to transfer the forces from the threaded spindle through the nut to its support and vice versa in a simply designed manner and with practically no play, in a preferred embodiment the spindle nut is arranged between two parallel plates. These plates have aligned bores which penetrate the threaded spindle with radial play. The bores do not prevent the automatic adjustment of the nut and the section of the threaded spindle supporting them. Plates of this type are also advantageous to the extent that end sections of the bar which prevent the threaded nut from rotating, and whose end sections project beyond the threaded nuts, can be secured in them.

The two frontal surfaces of the threaded nut, which abut the plates, can be formed in a convex manner in order not to prevent the automatic adjustability of the nut despite a practically play-free reception of the nut between the plates. In many cases, however, it is sufficient if the two frontal surfaces of the spindle nut each have a central portion surrounding the opening of the threaded bore, which portion lies in a plane perpendicular to the longitudinal axis of the threaded bore, and that edge areas formed by beveled regions are joined to this central portion. This type of form of the frontal surfaces of the nut is more cost effective.

BRIEF DESCRIPTION OF THE DRAWINGS

The invention is described below in greater detail with the aid of an exemplary embodiment illustrated in the drawings.

DETAILED DESCRIPTION OF A PREFERRED EMBODIMENT

Figure 1:
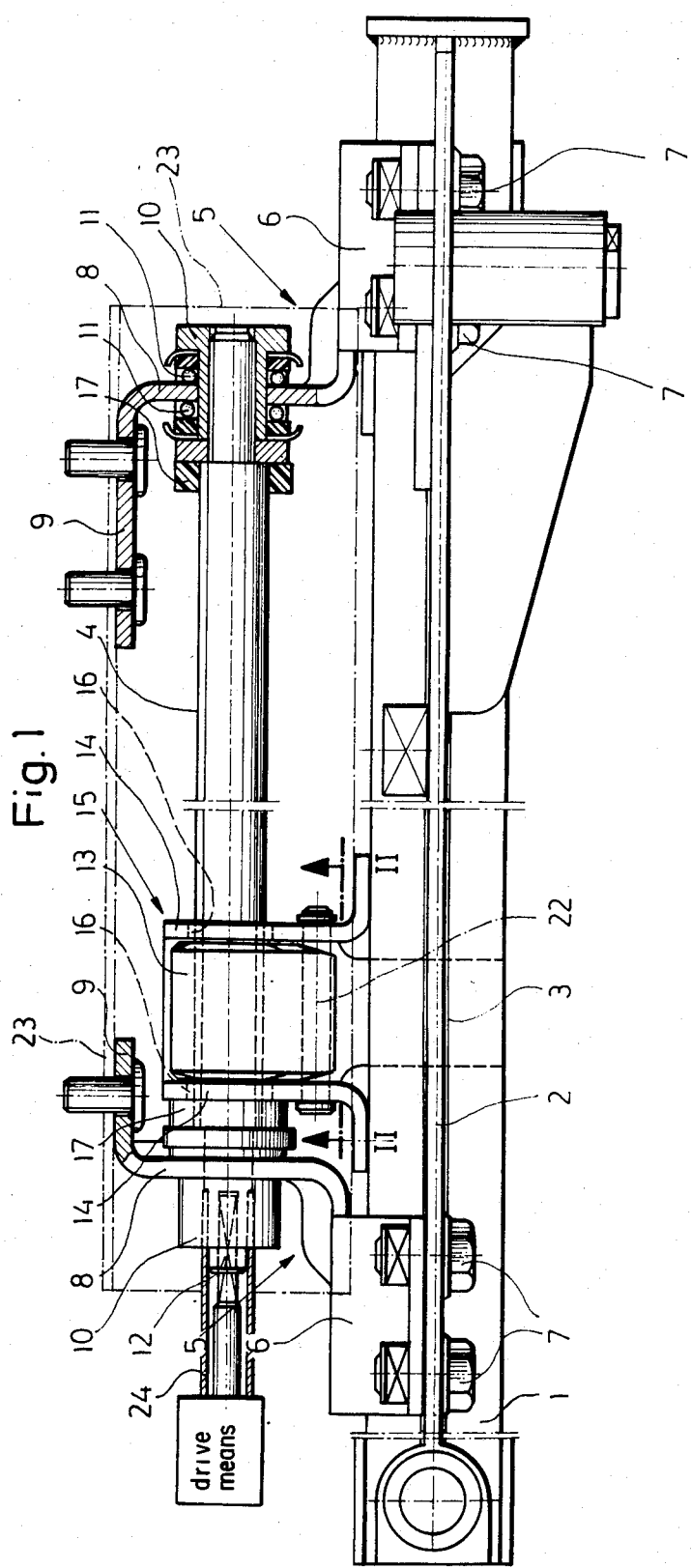
FIG. 1 is a top view of the exemplary embodiments.

A vehicle seat, which is formed in a known manner and is therefore not illustrated, is connected with the vehicle floor by means of two rail pairs, which are arranged so as to be adjacent to each other and spaced from each other and extend in the longitudinal direction of the seat. Since both rail pairs are formed identically as mirror images of each other, only one pair is illustrated in FIG. 1, which consists of the guide rail 1 rigidly connected with the vehicle floor or a console provided thereon and a slide rail 2 attached directly or indirectly to the frame of the vehicle seat. This slide rail 2 engages form-fittingly with the guide rail 1 laterally to its longitudinal direction, but in the longitudinal direction of the rails it is slidably guided in the guide rail 1.

In the exemplary embodiment the guide rail 1 has a C-shaped cross section that is open toward the top, and the slide rail 2 has a T-shaped cross section, the cross piece of which is guided inside the guide rail 1. The longitudinal piece of the slide rail projects out of the guide rail 1 through the longitudinal slot 3 formed in the C-shaped rail. The longitudinal piece of the slide rail 2, which piece lies in a vertical plane, is rigidly connected with the upholstery support (not shown) of the vehicle seat, for example by means of screws (also not shown).

In order to steplessly adjust the vehicle seat in its longitudinal direction and fix it in the desired selected position, an adjusting and setting device is associated with each rail pair. These adjusting and setting devices are formed and arranged as identical mirror images of each other, and therefore only one of these two adjusting and setting devices is illustrated and described below.

As shown in FIG. 1, the adjusting and setting device associated with the guide rail 1 and the slide rail 2 includes a threaded spindle 4 which is arranged parallel to but spaced from the two rails, and its two recessed end sections each are rotatably mounted in a holder 5. The two holders 5, which are formed from bent sheet metal, each have an angle-forming flange element 6 with which they are connected to the longitudinal piece of the slide rail 2 by means of screws 7. In addition, each of the two holders 5 has a plate section 8, which forms the mounting plate for one or the other of the end sections of the threaded spindles 4 and therefore lies in a plane to which the longitudinal axes of both the threaded spindle 4 as well as the guide rail 1 and the slide rail 2 are perpendicular. In the exemplary embodiment another bent end section 9 is connected to the plate section 8, which end sections 9 are connected with a cover 23, shown only with broken lines for better overview, which covers the threaded spindle 4 and connects the end sections 9 to resist pressure and tension.

Respective bushings 10, which penetrate the respective plate sections 8, are screwed to the two opposite end sections of the threaded spindles 4 to mount same. The bushing 10 illustrated in section in FIG. 1 supports two axial ball bearings 11, between which lies the portion of the plate section 8 which forms the edges of the access opening in the plate section 8 for the bushing 10. The axial ball bearings 11, which can also be loaded in the radial direction, therefore transfer the forces acting in an axial direction of the threaded spindle 4 from the holder 5 to the threaded spindle and vice versa, with minimal friction and also rotatably mount the threaded spindle 4 in this holder. The bushing 10 located on the left end section of the threaded spindle 4, as illustrated in FIG. 1, and which is comprised of a plastic having good sliding characteristics, is mounted directly in a mounting bore of the plate section 8. It holds only the covering of a flexible shaft 24.

Since, in the exemplary embodiment, a drive for the threaded spindle 4 is provided by means of a motor, the left end, as illustrated in FIG. 1, is provided with a central, multiple-sided blind hole 12, in which a correspondingly formed carrier element on the end of the flexible shaft 24 engages. At the other end, the flexible shaft is coupled with the drive motor.

The threaded spindle 4, the threading of which is of such an angle as to be self-locking, carries a spindle nut 13 which is located almost play-free between the two parallel shanks 14 of a portion of a spindle nut holder 15 that is U-shaped in cross section. As shown in FIG. 1, the spindle nut holder 15 has a tongue-shaped connecting section as an extension of the yoke section of the U-shaped portion and respective bent connection sections as extensions of the two shanks 14, all of which abut either the sides or bottom of the guide rail 1 and are screwed thereto or otherwise rigidly connected therewith. The shanks 14 lie in planes parallel to the plate sections 8 and are provided with respective access openings 16 for the threaded spindles, the diameters of which are larger than the outside diameter of the threaded spindle, so that even with larger manufacturing and mounting tolerances the threaded spindle 4 can run freely in the access openings 16. To assure that the spindle nut holder 15 cannot come into contact with the bushings 10, which would lead to a jamming of the adjusting and setting device, respective elastic rings 17 abut the frontal surfaces of both bushings 10 facing the spindle nut holder 15.

The two frontal surfaces of the spindle nut 13 each have a central portion 18 surrounding the openings of the threaded bore, which portions lie in a plane to which the longitudinal axis of the threaded bore is perpendicular. Angled surface areas 19 adjoin this central portion 18, so that the axial length of the spindle nut 13 in the vicinity of its outer cover surface is less than in the vicinity of the central threaded bore.

Figure 2:
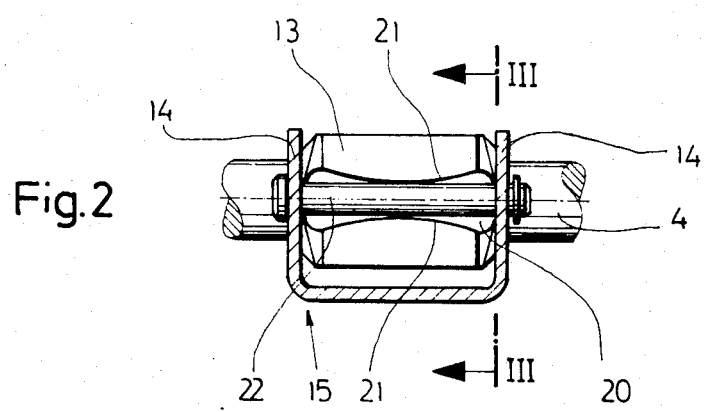
FIG. 2 is a cross-sectional view according to the line II—II in FIG. 1.
Figure 3:
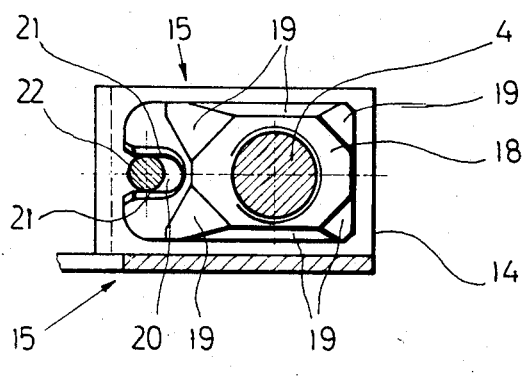
FIG. 3 is a cross-sectional view according to the line III—III in FIG. 2.
Figure 4:
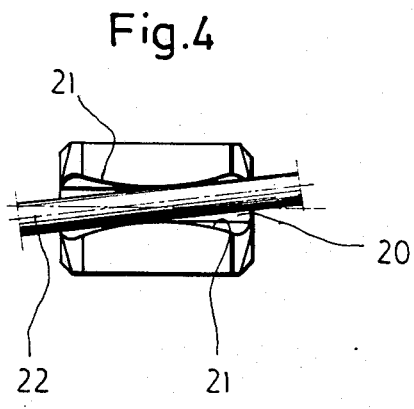
FIGS. 4 and 5 are each illustrations of the adjustability of the spindle relative to the arresting bolts in two perpendicular planes.
Figure 5:
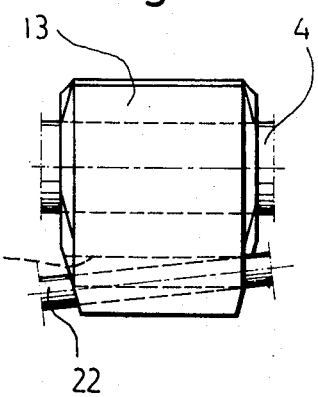

As shown particularly in FIGS. 1 and 3, the spindle nut 13 has a rectangular cross-sectional shape, because next to but spaced from the threaded bore and parallel thereto, there runs an outwardly open channel 20 on the side opposite the threaded bore, which channel 20 extends over the entire axial length of the spindle nut 13. The two boundary surfaces 21 forming the sides of the channel 20, which is U-shaped in cross section, have, as shown in FIGS. 2 and 4, a cylindrical curvature, namely such that the width of the channel, measured between the two boundary surfaces 21, becomes larger from the midpoint in the channel toward either side. In the center of the channel, i.e., at the narrowest point, the width of the channel 20 is adapted to the diameter of a cylindrical arresting bar 22 which penetrates the channel 20 in its longitudinal direction, and the end sections of said arresting bar 22, which pass through the shanks 14 of the spindle nut holder 15, are attached thereto. As a result of the cylindrical curvature of the boundary surfaces 21, an acute angle can be present between the longitudinal axis of the channel 20 and that of the arresting bar 22, as shown in FIG. 4, without play occurring between the arresting bar 22 and the boundary surfaces 21 in one of the positions which the two can assume relative to each other. As shown particularly in FIG. 3, the depth of the channel 20 measured toward the center of the threaded bore is greater than the diameter of the arresting bar 22, so that the spindle nut 13 and the arresting bar 22 can also be adjusted into positions in which the longitudinal axis of the arresting bar 22 lies in a common plane with the longitudinal axis of the threaded bore, but encloses an acute angle with said longitudinal axis, as shown in FIG. 5. The connection between the arresting bar 22 and the spindle nut 13 can thus be compared with a cardan suspension, since movability is possible in two perpendicular planes.

Due to this cardan adjustability of the spindle nut 13 relative to the arresting bar 22, the spindle nut and the threaded spindle 4 can be adjusted into a position, even with large manufacturing and mounting tolerances, in which the threaded spindle can be easily rotated over the entire adjustment range, which extends from the point of contact of the one shank 14 with an elastic ring 17 to the point of contact of the other shank 14 with the other elastic ring 17. The unavoidable manufacturing and mounting tolerances arise from all parts which affect the position of the spindle and the spindle nut in relation to the slide rail and the guide rail. In consequence of unavoidable tolerances the axis of the bearings for the spindle and therefore the axis of the spindle will as a rule not coincide with the axis of the bore of the spindle nut which must be connected to one of the rails. The connection between the spindle nut and the rail to which this nut is associated, according to the invention, allows the spindle nut a self-adjustment with respect to the shanks although there is no play or substantially no play between the nut on one hand and the shanks and the bar on the other hand. In spite of the absence of play the nut is movable with respect to the shanks and the bar by the necessary amount. In practice one will adapt the distance between the shanks to the length of the nut. If the bar is a commercial pin, one will adapt the width of the channel. However, if the bar has to be manufactured for the device according to the application, it will be cheaper to adapt the pin to the channel.

Since, in the exemplary embodiment, the spindle nut holder 15 is connected to the guide rail 1, when the threaded spindle 4 is driven, the guide rail 1 is shifted in the longitudinal direction of the seat relative to the slide rail 2. Of course, it would also be possible to connect the holder 5 for the threaded spindle 4 with the guide rail 1 and the spindle nut holder 15 with the slide rail 2. In this case a driving of the threaded spindle would shift the spindle nut 13 in the longitudinal direction of the threaded spindle 4.

All characteristics mentioned in the present specification as well as those that can be obtained only from the drawing are components of the invention as additional embodiments, even if they have not been particularly emphasized and, particularly, if they are not mentioned in the claims.

We claim:

1. An adjusting device for vehicle seats, comprising:
    a threaded spindle connected in an axially immovable manner to one of two elements to be adjusted relative to each other;
    a spindle nut arranged on the spindle and connected in an axially immovable manner to the other of the two elements to be adjusted relative to each other; and
    wherein the spindle nut is provided with a continuous channel running parallel to a threaded bore which receives the threaded spindle, and which channel receives a bar connected to the other of the two elements, and which prevents a rotation of the spindle nut about the longitudinal axis of its threaded bore, and which has opposing boundary surfaces that cooperate with the bar and are spaced from each other such that at the midpoint in the length of the channel the intervening distance is equal to the thickness of the bar and toward the two ends of the channel this distance uniformly increases.

2. The adjusting device according to claim 1, wherein the two boundary surfaces have a cylindrical curvature.

3. The adjusting device according to claim 1, wherein the channel is open on the side opposite the threaded bore.

4. The adjusting device according to claim 1, wherein said channel has a width and a depth, said width being defined by the distance between said curved boundary surfaces and said depth extending parallel with said curved boundary surfaces and perpendicular to said width, and the depth of the channel is greater than the dimension of the bar in this direction.

5. The adjusting device according to claim 1, further comprising two parallel plates arranged on opposite sides of the spindle nut, the plates include aligned bores in which the threaded spindle penetrates with radial play.

6. The adjusting device according to claim 5, wherein the end sections of the bar which secures the spindle nut against rotation, project beyond the spindle nut, and are fixed in the plates.

7. The adjusting device according to claim 5, wherein the spindle nut has two frontal surfaces and the spindle nut is arranged without play between the frontal surfaces and plates, and the bar is arranged without play in ohly one direction between the boundary surfaces of the channel.

8. The adjusting device according to claim 7, wherein the two frontal surfaces of the spindle nut each have a central portion surrounding the opening of the threaded bore, which portion lies in a plane lying perpendicular to the longitudinal axis of the threaded bore, and in that on both frontal surfaces, edge area formed by areas adjoining the central portion.

9. An adjusting device for vehicle seats, comprising:
    a guide rail rigidly connected to a vehicle floor;
    a slide rail connected to a vehicle seat and slidably arranged within the guide rail;
    a threaded spindle rotatably attached to one of the guide rail and the slide rail;
    a spindle nut threadably arranged on the threaded spindle and connected to the other of the guide rail and the slide rail such that the spindle nut can pivot with respect to the other rail along two perpendicular axes; and
    wherein the spindle nut is provided with a continuous channel running parallel to a threaded bore which receives the threaded spindle, and which channel receives a bar in a non-sliding manner whereby said nut does not slide on said bar and which prevents a rotation of the spindle nut about the longitudinal axis of its threaded bore, and which has opposing boundary surfaces that cooperate with the bar and are spaced from each other such that at the midpoint in the length of the channel the intervening distance is equal to the thickness of the bar and toward the two ends of the channel this distance uniformly increases.

10. The adjusting device according to claim 9, further comprising drive means connected to the threaded spindle for rotating the spindle;
    wherein the spindle and spindle nut are so arranged that rotation of the spindle causes the guide rail and the slide rail to translate with respect to each other.

11. The adjusting device according to claim 9, wherein the spindle nut has two parallel bores extending therethrough.

12. The adjusting device according to claim 11, wherein one of said bores is threaded and engages with the threaded spindle.

13. The adjusting device according to claim 12, wherein the other of said bores has an inner diameter at its midpoint and the diameter is progressively larger away from the midpoint.

14. The adjusting device according to claim 13, further comprising a bar means parallel to the threaded spindle and connected to the other of the guide rail and the slide rail, the bar means extending through the other bore in the spindle nut.

* * * * *